Jan. 13, 1970     D. O. BIGLIN ET AL     3,488,805
APPARATUS FOR FORMING MOLDED PLASTIC ARTICLES
Filed March 16, 1967     3 Sheets-Sheet 1

INVENTOR.
DUANE O. BIGLIN
BY JEROME R. GROTHJAN
Philip M. Rice
& W. A. Schaich
ATTORNEYS

Jan. 13, 1970      D. O. BIGLIN ET AL      3,488,805
APPARATUS FOR FORMING MOLDED PLASTIC ARTICLES
Filed March 16, 1967      3 Sheets-Sheet 3
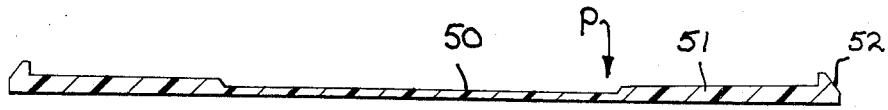
FIG. 8    PRIOR ART · BEFORE COOLING
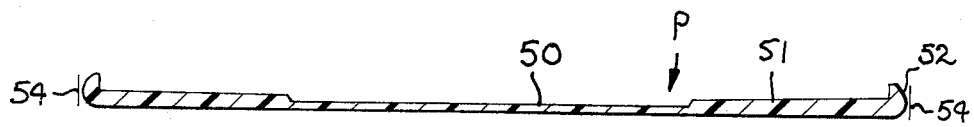
FIG. 8A    PRIOR ART · AFTER COOLING
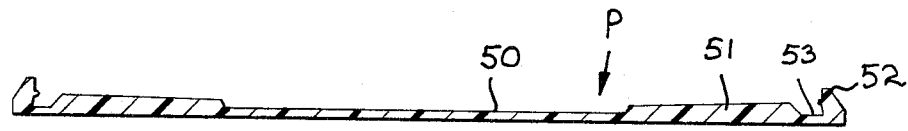
FIG. 9
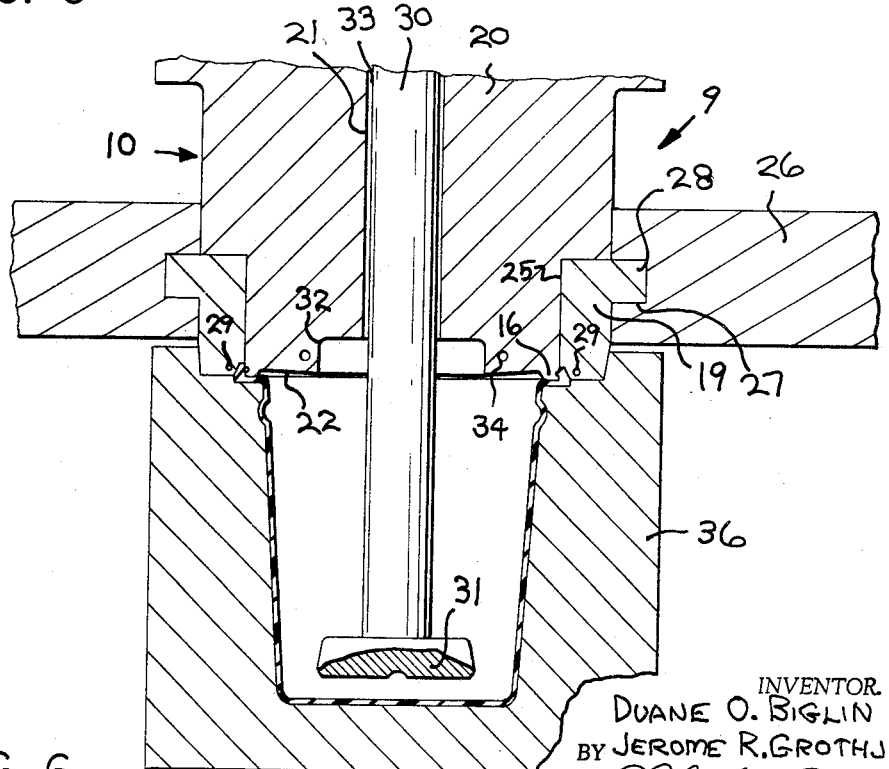
FIG. 6
INVENTOR.
DUANE O. BIGLIN
BY JEROME R. GROTHJAN
Philip M. Rice
& W. A. Schaich
ATTORNEYS

United States Patent Office 3,488,805
Patented Jan. 13, 1970

3,488,805
APPARATUS FOR FORMING MOLDED PLASTIC ARTICLES
Duane O. Biglin and Jerome R. Grothjan, Toledo, Ohio, assignors to Owens-Illinois, Inc., a corporation of Ohio
Filed Mar. 16, 1967, Ser. No. 623,679
Int. Cl. B29f *1/00;* B29c *1/14*
U.S. Cl. 18—5     7 Claims

ABSTRACT OF THE DISCLOSURE

In apparatus for forming a thermoplastic parison having a rim portion encircling a central portion capable of subsequent deformation, the improvement of mold means contoured to retain thermoplastic material in the rim cavity to control the dimensions of the rim by preventing its shrinking away from the wall of the rim cavity upon cooling. The parison produced by such apparatus has a central bottom wall and sidewall forming portion and a rim portion joined thereto by a thin web of material.

Background of the invention

It is generally known to form a plastic container by a method wherein a substantially planar parison is injection molded in an injection mold cavity and is then carried by part of the injection mold to a blow mold where such parison is pressure formed into an article whose exterior surface conforms to the mold cavity. Such a process is disclosed in Canadian Patent No. 730,061, issued Mar. 15, 1966.

Difficulties have been encountered in such process in maintaining the rim portion to precisely the desired contour. An accurately contoured rim portion is necessary to insure that a closure designed for such container will sealingly engage such rim. The difficulty in maintaining the contour of the rim during forming arises in large measure from cooling of the parison between the time it is injection molded from heated thermoplastic material until the time it is molded to its final configuration. Such cooling causes the parison to shrink, pulling the rim portion radially inwardly away from the rim molding surface thereby causing the rim portion of the finished article to be out of the desired contour.

It is an object of the present invention to provide apparatus for forming a parison adapted to subsequently be molded into a cup-shaped container having a precisely contoured rim portion.

It is a further object of the present invention to provide apparatus for injection molding a parison having a rim, which apparatus is characterized by the feature of a mold portion which securely holds the rim portion thereof to substantially the contour of the mold during cooling.

A further object of the present invention is to provide a parison having a precisely formed rim portion, which parison can be subsequently deformed into a cup-shaped container having a precisely contoured rim portion.

Other objects and advantages of the present invention will become readily apparent to those skilled in the art from the following detailed description taken in conjunction with the annexed sheets of drawings on which:

FIGURES 3–6 are vertical sectional views illustrating the steps in the forming of a cup-shaped container from the injection molded parison.

FIGURE 8 is an enlarged sectional view showing the desired configuration of a prior art parison.

FIGURE 8A is a view similar to FIGURE 8 showing, after cooling, a parison formed in a mold having a cavity conforming to the configuration shown in FIGURE 8.

FIGURE 9 is an enlarged sectional view of a parison formed according to the present invention.

Figure 1:
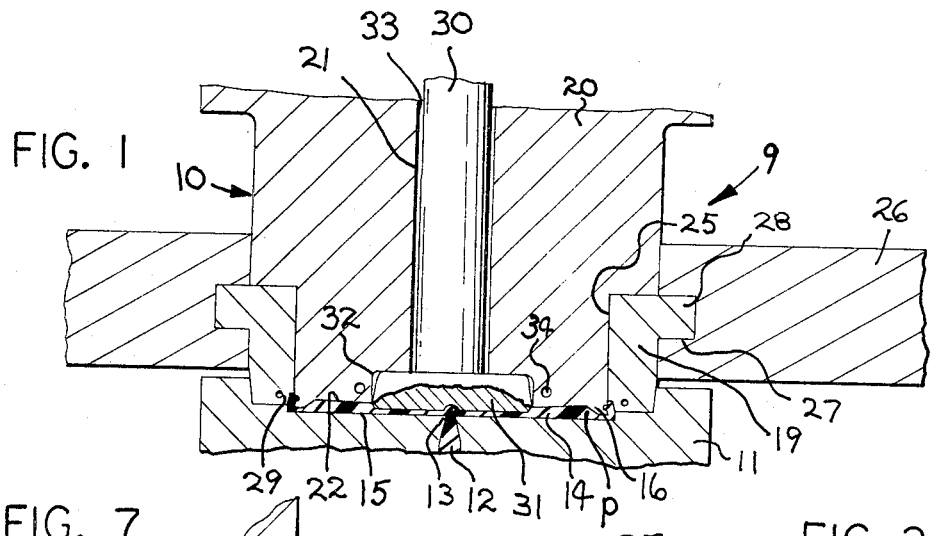
FIGURE 1 is a vertical sectional view showing the apparatus of the present invention upon completion of injection molding a parison.

Referring now to the drawings, there is provided an injection mold generally designated by the numeral 9 comprising a lower injection block 11 having a supply channel 12 therein adapted to receive plasticized thermoplastic material from a suitable source, as from a conventional plasticizer-extruder. The supply channel 12 terminates in an upper reduced orifice 13 from which the plasticized material flows into an injection mold cavity 14. The injection mold cavity 14 is defined between the upper planar surface 15 of the block 11 and an upper injection mold assembly indicated generally by the numeral 10 and is adapted to have molded therein a parison P. As may be seen from FIGURE 9, the parison P includes a central planar portion 50 encircled by a sidewall molding portion 51 which is frusto-conical in shape. Radially outwardly from the sidewall molding portion 51 is an annular rim portion 52 joined to said sidewall molding portion 51 by a web portion 53 which is substantially thinner in cross section than said sidewall molding portion 51.

The upper injection mold assembly 10 includes ring element 19 which is annular in shape and which receives therein a central mold element 20 having an internal bore 21. The central mold element 20 is snugly but slidably received in the ring element 19, with a sidewall portion 25 of the central mold element 20 contacting the ring element 19. The central mold element 20 terminates at its lower end in a parison sidewall molding surface 22 which is frusto-conical in shape and which cooperates with the upper planar surface 15 of the lower injection block 11 to define a gap which is relatively thin toward this central axis and becomes somewhat thicker radially outwardly therefrom.

Figure 2:
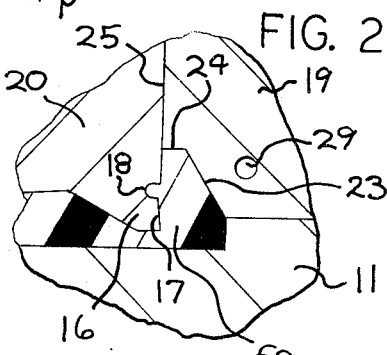
FIGURE 2 is an enlarged fragmentary view of a portion of the apparatus shown in FIGURE 1.

Radially outwardly from the parison sidewall molding surface is a downwardly extending annular lip 16 which forms the upper surface of the web portion 53. The outer periphery of the annular lip may taper slightly inwardly and upwardly as at 17 (FIGURE 2) and may have an annular groove 18 formed therein which serves to aid in retaining the parison P on the lower end of the central mold element 20.

The ring element 19 has a notch at the inner corner facing the lower injection block 11. The notch is defined by an inwardly facing wall portion 23 and a downwardly facing wall portion 24 which cooperate with the wall portions 17 and 25 of the central mold element 20 to define the rim cavity in which the rim portion 52 is formed. Additionally, the ring element 19 has a cooling passage 29 formed therein to aid in cooling and setting the rim portion 52.

The purpose of the downwardly extending annular lip 16 is to retain thermoplastic material in the rim cavity and thereby prevent its being pulled radially inwardly upon cooling and shrinking of the parison P. Additionally, the annular lip 16 serves to partially isolate the thermoplastic material in the rim cavity from that in the remainder of the mold cavity 14 thereby permitting the material in such rim cavity to be cooled without excessively cooling the other portions of parison P. The lip 16 should be spaced from the planar surface 15 sufficiently far to permit the thermoplastic material to flow completely into the rim cavity and yet sufficiently close to accomplish the above objectives. Spacing on the order of 0.030 inch has proven satisfactory. Such spacing, of course, determines the thickness of the parison web portion 53. FIGURES 8 and 8A, labeled prior art, illustrate the change in contour that takes place in parisons molded prior to the present invention. Thus, when initially molded, the parison P conforms precisely to the design configuration as shown in FIGURE 8. However, upon cooling, the parison P shrinks causing the outer corner of the rim 52 to pull in severely from its original maximum diameter as illustrated by the numeral 54 in FIGURE 8A. FIGURE 9 shows a parison formed in accordance with the present invention both before and after cooling.

Referring again to FIGURE 1, movement of the ring element 19 relative to the central mold element 20 is effected by means of a carrying member 26 having a groove 27 in which a radially outwardly projecting flange 28 of ring element 19 is received. Any desired power means may be utilized for moving the carrying member 26 and, thus, the ring element 19 axially with respect to the central mold element 20. It may be readily appreciated that movement of the ring element 19 downwardly with respect to the central mold element 20 will serve to strip or eject an article therefrom. The central mold portion 20 is provided with a passage 34 through which a heating medium may be circulated to assist in maintaining the sidewall forming portion 51 of the parison P in a condition of plasticity.

Positioned in the bore 21 of the central mold element 20 is a vertically reciprocable piston rod 30 carrying on the free end thereof a circular disc-like element or plunger 31. When retracted, as during the injection molding step illustrated in FIGURE 1, the plunger 31 is positioned in a recess 32 formed in the lower end of the central mold element 20. The lower face of the plunger 31 cooperates with the upper planar surface 15 to define the central planar portion 50 of the parison which will be the bottom of the finished container.

Figure 5:
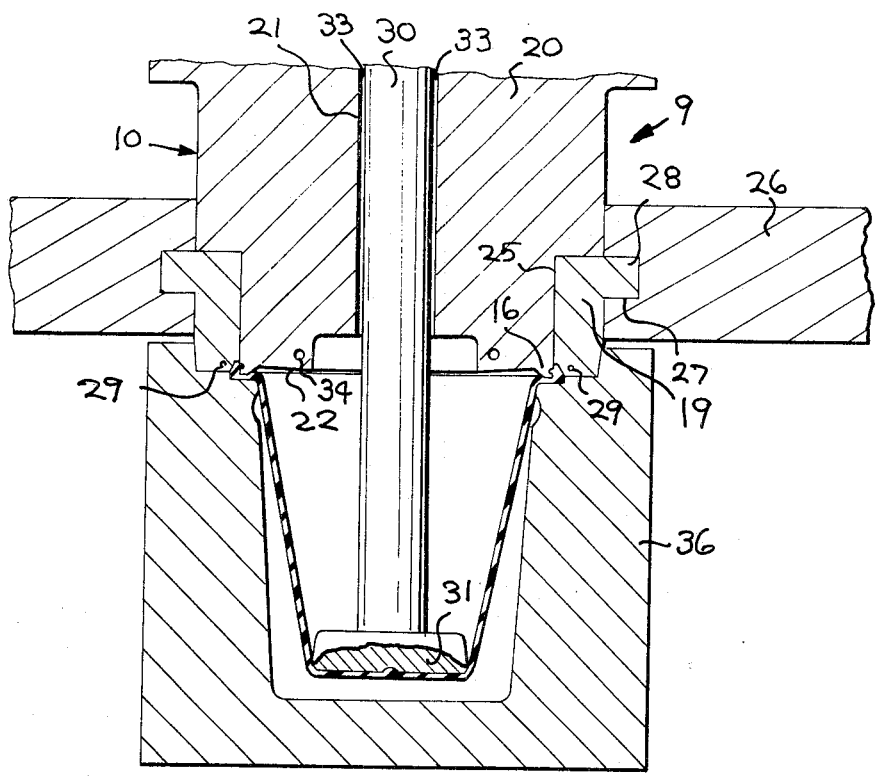

The piston rod 30 is spaced from the wall of the bore 21 to provide an annular passageway 33 through which pressured fluid may be introduced to expand the stretched parison into conformity with the molding cavity of a blow mold 36 (see FIGURES 5 and 6).

In operation, the upper mold assembly 10 is positioned against the lower injection block 11 and heated thermoplastic material is injection molded in the cavity 14 through the supply channel 12.

Figure 3:
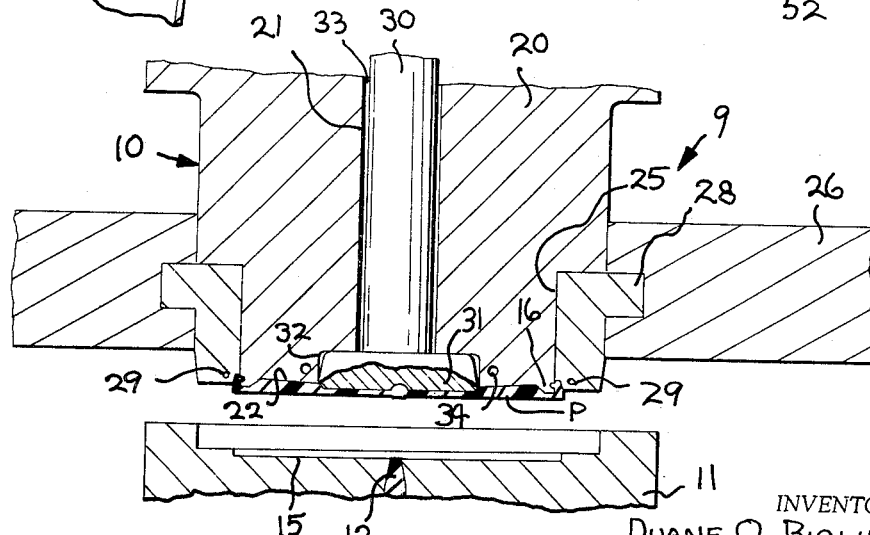

The injection molding step results in the plasticized material completely filling the cavity including the rim defining portion thereof to form the substantially flat disc-like parison P. Upon completion of the injection molding step, a cooling medium is introduced through passageway 29 to cause the thermoplastic material forming the rim 52 to become substantially set. Thereafter, the upper mold assembly 10 is lifted by any desired power means from the lower injection block 11 (FIGURE 3) and transferrd to the blow mold 36 (FIGURE 5). The upper mold assembly 10 carries with it the injection molded parison P which is held thereon by virtue of the rim portion engaged in the rim cavity.

Figure 4:
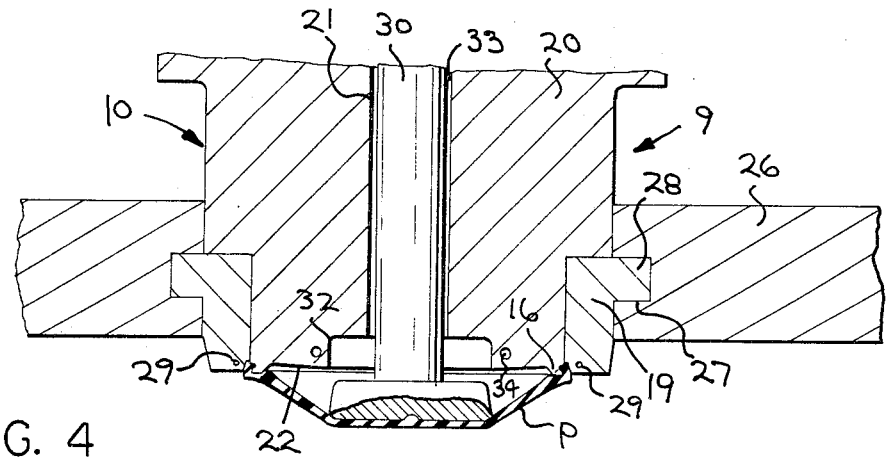

Upon disengagement of the upper mold assembly from the lower injection block 11, the plunger 31 is partially extended to urge the parison P out of contact with the molding surface 22 (FIGURE 4).

Figure 7:
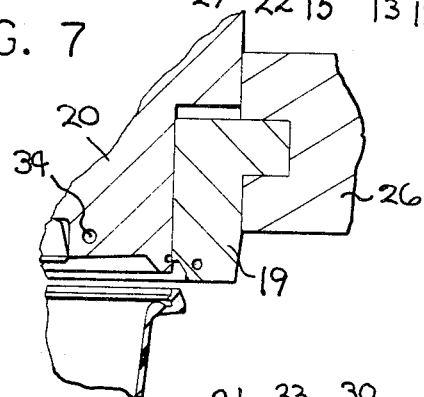
FIGURE 7 is an enlarged fragmentary view showing the finished container after removal from the blow mold while it is being stripped or ejected from the injection mold half carrying it.

Thereafter, as illustrated in FIGURES 5 and 6, the upper mold assembly 18 carrying the partially deformed parison is positiond on the blow mold 36 and pressured fluid is introduced through the passageway 33 to expand the parison into conformity with the cavity of the blow mold. Upon completion of the blowing step, the upper mold assembly 10 is raised to remove the container from the blow mold. The carrying member 26 is then urged downwardly (FIGURE 7) carrying the ring element 19 therewith, moving it relative to the central mold element 20 to strip or eject the formed container therefrom.

It will be readily seen from the foregoing that the present invention provides apparatus capable of forming containers much more efficiently and with a much more precisely formed rim portion than was heretofore possible.

It should be recognized that although the present invention has been described in an operation wherein the finished container is formed, for some operations it may be desirable to supply the parison itself as an article to a blow molder who subsequently deforms it to the desired shape. In that event, the passage 34 may be used for cooling rather than heating. In either event, the necessity of maintaining a precisely contoured rim portion will be appreciated.

Numerous modifications will become readily apparent to those skilled in the art. Accordingly, the true scope of the invention is defined in the following claims.

We claim:

1. In apparatus for forming a plastic container having an injection molded rim portion comprising:
  an injection mold including a mold front and a mold back cooperating to define a cavity for molding a parison having:
    (1) a central bottom wall forming portion approximating the thickness of the bottom wall of the finished container;
    (2) an annular sidewall forming portion for the container surrounding and integral with the outer periphery of said bottom wall forming portion; and
    (3) a rim forming portion integral with the outer periphery of said annular sidewall forming portion and having a cross-sectional configuration of substantially the rim of the finished container;
  the improvement comprising means of said injection mold back for providing a reduced parison thickness between said rim portion and said annular sidewall forming portion, said means including an annular lip between the annular sidewall and the rim molding surfaces respectively of said mold back, said annular lip extending partially across the gap defining said mold cavity when said mold front and said mold back are closed.

2. Apparatus for molding cup-shaped plastic containers comprising:
  (a) means for injection molding a preformed plastic blank having:
    (1) a rim portion conforming substantially to the rim portion of the finished container;
    (2) a central portion within said rim portion; and
    (3) a web portion joining said central portion to said rim portion, said web portion being substantially thinner than the central portion adjacent thereto;
  (b) means for cooling and setting said rim portion while maintaining said central portion in condition of plasticity for subsequent deformation; and
  (c) means for effecting deformation of said central portion to form a cup-shaped article; the web defining portion of the injection molding means being constructed to retain the rim portion of the blank to its injection molded configuration during operation of the means set forth in (b) and (c).

3. Apparatus for molding cup-shaped plastic articles comprising first, second and third molding units, said first and second units cooperating when engaged to define an injection molding cavity, and said second and third units cooperating when engaged to define a cup-shaped cavity conforming to the configuration of the desired article, and means for moving said second molding unit with an injection molded parison thereon from said first to said third molding unit, said first molding unit including a substantially planar molding surface, said second molding unit including (1) a central mold element; and (2) an annular ring encircling said central mold element; said central element cooperating with the first unit planar surface to define a parison body forming gap having a greater thickness than the wall thickness of the desired article, the outer periphery of said central element having annular lip extending axially toward said first unit planar surface and cooperating therewith to define a parison web forming gap having a thickness substantially less than the adjacent body forming parison portion, said annular lip cooperating with said annular ring and said first molding unit to define a rim cavity corresponding to the rim of the desired article, said rim cavity communicating with said body forming gap by means of said web forming gap, and means for deforming a parison carried by said second unit to said third unit into conformity with said cup-shaped cavity.

4. The apparatus defined in claim 3 further including means for cooling and setting plastic material in the rim cavity.

5. The apparatus as defined in claim 3 wherein said web forming gap is less than one-half the thickness of the adjacent body forming gap portion.

6. The apparatus as defined in claim 3 wherein said web forming gap is approximately 0.030 inch.

7. The apparatus defined in claim 4 further including means for heating plastic material in the body forming gap to maintain such material in a condition of plasticity.

References Cited

UNITED STATES PATENTS

| 3,305,158 | 2/1967 | Whiteford. |
| 3,324,509 | 6/1967 | Hey et al. |
| 3,341,043 | 9/1967 | Santelli. |
| 3,341,644 | 9/1967 | Allen. |

FOREIGN PATENTS

| 274,084 | 5/1963 | Australia. |
| 642,609 | 5/1964 | Belgium. |

WILBUR L. McBAY, Primary Examiner

U.S. Cl. X.R.

18—19, 30